W. E. C. EUSTIS.
Furnace for Smelting Ore.

No. 166,977. Patented Aug. 24, 1875.

Witnesses.
S. U. Piper
L. N. Höller

Wm. E. C. Eustis
by his attorney.
N. H. Eddy

UNITED STATES PATENT OFFICE.

WILLIAM E. C. EUSTIS, OF MILTON, MASSACHUSETTS.

IMPROVEMENT IN FURNACES FOR SMELTING ORE.

Specification forming part of Letters Patent No. 166,977, dated August 24, 1875; application filed July 3, 1875.

CASE A.

*To all whom it may concern:*

Be it known that I, WILLIAM E. C. EUSTIS, of Milton, of the county of Norfolk and State of Massachusetts, have made a new and useful invention having reference to the smelting of ore, or making steel directly from such, and to furnaces therefor; and I do declare the same to be fully described in the following specification, reference being had to the accompanying drawings illustrative of the compound furnace devised by me for carrying out my process or method of smelting ore and combining molten pig metal therewith.

Figure 1:
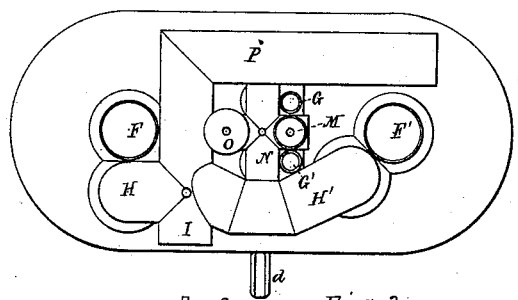
Figure 2:
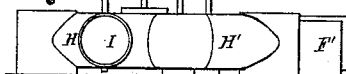
Figure 2:
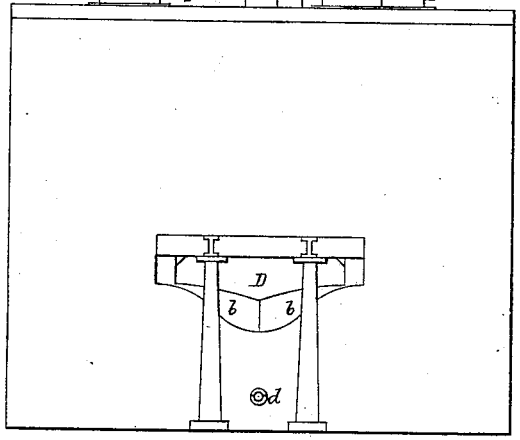
Figure 4:
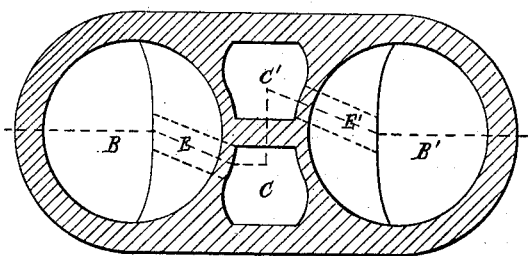
Figure 3:
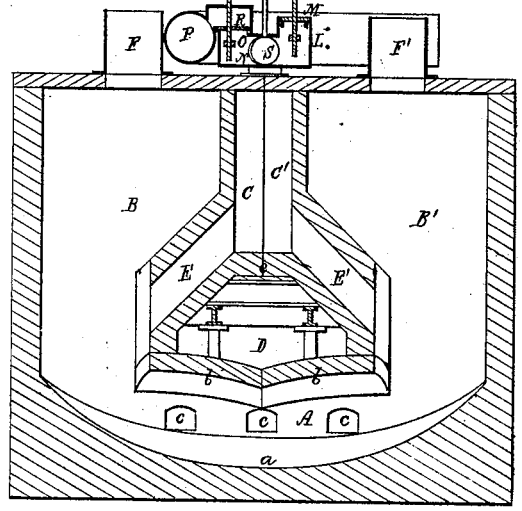
Figure 6:
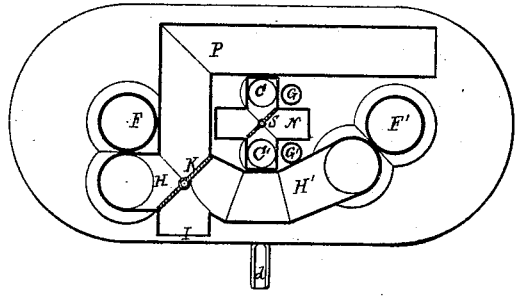
Figure 5:
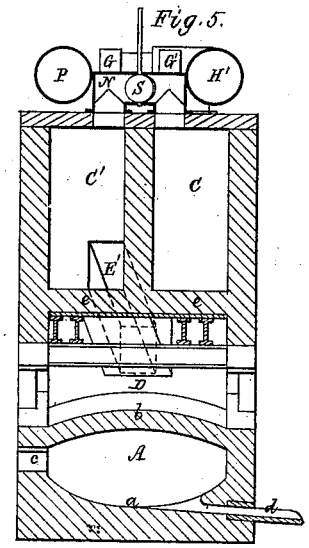

Of the said drawings, Figure 1 is a top view, Fig. 2 a front elevation, Fig. 3 a longitudinal and vertical section, Fig. 4 a horizontal section, and Fig. 5 a transverse and vertical section, of the said furnace. Fig. 6 is a horizontal section through the air and gas conduits and their valves.

The furnace hereinafter described can be used for forcing air and gas in separate columns through charges of metal, as iron, for instance, or of ore and metal, and passing the resultant spent gases of combustion through like charges, and next, by reversal of the direction of the said currents, passing the air and gas through the last-mentioned charges, and the products of combustion thereof through those first mentioned, whereby the charges to be melted are made to serve to heat the gases for melting them.

In the drawings, A denotes the main reducing-chamber of the furnace, the hearth of which is shown at $a$, the crown or roof at $b$, the doorways at $c\ c\ c$, and the tap-hole at $d$. Leading upward from opposite ends of the main chamber are two auxiliary chambers or ore-receptacles, B B', between which there are arranged two others, but smaller in height and diameter or width, these latter being shown at C C'. The floors $e\ e$ of the chambers C C' are above the roof of the main chamber A, there being between the two, and extending over the said roof, in manner as shown, an open space or passage, D, the purpose of which is to enable access to be readily had to the roof and parts about such passage for repair thereof, as occasion may require. From each of the chambers C C', at or near its bottom, an inclined passage, E or E', leads into one of the ore-chambers B B'—that is, the chamber C communicates with the chamber B by the passage E, and the chamber B' with the chamber C' by the passage E'. These chambers are closed at their tops, except that to each there is a charging-hopper or induct, as shown at F, F', G, and G'. Furthermore, branch pipes H H' from a gas-conduit, I, lead into the said ore-chambers B B', there being at the junction of the said branch pipes and gas-conduit a damper, K, by means of which, while gas may be forced into the pipe I, such gas may be caused to pass into either branch pipe, and be prevented from passing into the other. An air-induct, L, provided with a regulating-valve, M, communicates with the two metal chambers C C' by a cross or branch conduit, N, and also with a valve-case, O, which opens into an educt or continuation, P, of the gas-induct I. The case O is furnished with a valve, R, to regulate the escape of air into the educt P, which generally is to lead to and into a chimney. There is also at the crossing or junction of the conduits L N a reversing-damper, S, by which the air may be caused to pass into either of the chambers C C' at pleasure.

In using the above-described compound furnace the two larger auxiliary vertical chambers B B' are to be charged, like the stack of a common smelting-furnace, with iron ore, and the two auxiliary vertical chambers C C' are to be charged with pig-iron or scrap-iron, or both. Combustible gas is to be blown down through the ore-charge in the chamber B, and a blast of air is at the same time to be forced down through the charge of the chamber C, opening into such chamber B. The air and gas, commingling, are to be inflamed in the lower portion of the charge of the chamber B, the flame being driven through the chamber A. The flame and spent gaseous products of combustion escaping from the chamber A will pass up into and through the charge of ore of the chamber B', and the charge of metal in the chamber C', and thence into the educt P. After this operation has gone on a sufficient time the reversing-dampers are to be turned into positions at right angles with their former ones, whereby the gas will be caused to pass into and down through the hot-ore charge of the chamber B', and the air-blast will be made to pass down through the hot metal in the chamber C'. Both currents of air and gas, in going down through the charges, will absorb heat therefrom, so that when they come together in the lower part of the body of ore their combustion will be greatly promoted. The flame from them, rushing through the main chamber A, will, with the spent gases, pass up through the charges of the chambers B and C, and thence into the chimney, the amount escaping at any time from either of the chambers C C' being regulated by the valve R of the case O.

In consequence of the discharging-passage of each chamber C C' being above the crown of the main chamber A, the molten metal from the charge in such chamber C or C' will flow directly downward into the lower part of the ore-charge of the next chamber B B'—viz., into that part of it which, deprived of oxygen, may have been reduced to what iron-smelters term "sponge"—and, passing by gravity into it, will mix with and flux it to better advantage than would be the case were the bottoms of the ore and metal chambers on a level, or thereabout. The metal and slag passing from the ore will flow over the hearth of the chamber A, through which chamber the flame of the aerated gas will also pass. The pig or scrap metal in each of the smaller auxiliary chambers C C' will be heated and melted by the flame and spent gases while going through it, the amount thereof passing through it, and escaping from it into the educt, being regulated by the damper R; consequently the rate of melting of the charge of the chamber C or C' will be entirely under control, such being an essential element in the successful making of iron and steel by my process. The melted metal from the chamber C or C' runs down into and through a pile of intensely-heated metallic sponge, and by so doing becomes intimately mixed therewith. The metallic sponge is, so to speak, fluxed by the molten pig metal, any remaining oxygen in the sponge being extracted, and the melting of the sponge hastened or facilitated.

The chambers B B' and C C' may be arranged to open directly into the top of the main chamber A at its ends; but by having the chambers C C' open immediately into the chambers B B', and these latter into the main chamber, all as shown, we gain, as before stated, the advantage of dropping the melted pig or scrap metal directly upon the top or upper portion of the sponge, and its passage through such sponge, so as to facilitate or hasten the melting thereof.

I do not claim mixing metallic sponge and pig metal in the making of iron or steel.

I claim—

1. The compound furnace for treating ore and pig or scrap metal, the same being composed of the main chamber A, the two ore-receiving chambers B B', the metal-receiving chambers C C', the connecting passages E E', and the system of gas and air inlet conduits I H H' L N, dampers K S, air-escape-regulating valve R, and educt P, all being arranged and combined substantially as and to operate as described.

2. The compound furnace, as provided with the reparation chamber or space D, arranged with the main and auxiliary chambers A B B' C C' and the inclined passages E E', substantially in manner as described and represented.

3. In the manufacture of iron from the ore, or in remelting iron, the above-described process, which consists in forcing air and gas in separate columns through charges of metal, or ore and metal, and passing the resultant spent gases of combustion through like charges, and next, by reversal of the direction of the said currents, passing the air and gas through the last-mentioned charges, and the products of combustion thereof through those first mentioned, whereby the charges to be melted serve to heat the gases for melting them, all being substantially as set forth.

WILLIAM E. C. EUSTIS.

Witnesses:
R. H. EDDY,
J. R. SNOW.